(12) United States Patent
Anderson et al.

(10) Patent No.: US 6,694,009 B1
(45) Date of Patent: Feb. 17, 2004

(54) ESTIMATION OF A WORK ITEM'S WAIT-TIME FROM THE PRESENT STAGES OF PROCESSING OF PRECEDING WORK ITEMS

(75) Inventors: Gregory L. Anderson, Dallas, TX (US); Andrew D. Flockhart, Thornton, CO (US); Robin H. Foster, Little Silver, NJ (US); Eugene P. Mathews, Barrington, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/333,215

(22) Filed: Jun. 15, 1999

(51) Int. Cl.⁷ .................................................. H04M 3/00
(52) U.S. Cl. ............................ 379/266.06; 379/266.01; 379/265.08
(58) Field of Search .......................... 379/265.01, 266.1

(56) References Cited

U.S. PATENT DOCUMENTS

| | | | |
|---|---|---|---|
| 4,959,686 A | | 9/1990 | Spallone et al. ............ 364/401 |
| 5,506,898 A | * | 4/1996 | Costantini et al. ..... 379/265.04 |
| 5,790,974 A | * | 8/1998 | Tognazzini ................ 340/988 |
| 5,867,572 A | * | 2/1999 | MacDonald et al. ... 379/265.08 |
| 5,905,793 A | * | 5/1999 | Flockhart et al. ...... 379/265.02 |
| 5,999,617 A | * | 12/1999 | Oyanagi et al. ......... 379/265.1 |
| 5,999,965 A | * | 12/1999 | Kelly ........................ 709/202 |
| 6,148,396 A | * | 11/2000 | Chrysos et al. ............ 712/216 |
| 6,263,065 B1 | * | 7/2001 | Durinovic-Johri et al. ..................... 379/265.02 |
| 6,330,326 B1 | * | 12/2001 | Whitt ..................... 379/265.12 |
| 6,366,666 B2 | * | 4/2002 | Bengtson et al. ...... 379/265.06 |

FOREIGN PATENT DOCUMENTS

| | | | | |
|---|---|---|---|---|
| EP | 0 899 673 A | 3/1999 | ............ | G06F/17/60 |
| JP | 2000020832 | 1/2000 | ............ | G07G/1/12 |
| WO | 97 15136 A | 4/1997 | ............ | H04M/3/50 |

* cited by examiner

Primary Examiner—Harry S. Hong
Assistant Examiner—Hector Agdeppa
(74) Attorney, Agent, or Firm—David Volejnicek

(57) ABSTRACT

To improve the prediction of wait times of calls (23) waiting to be processed, or to improve the prediction of completion times of calls that are presently being processed, in low-volume call centers (10) or splits/skills (21), additional data points are created—either manually or automatically—during the processing of each call that is presently being processed, for use in effecting wait-time estimates of the waiting calls. At each of the plurality of points in the processing of each of the plurality of calls, information about the call that is relevant to how long completion of the processing of the call is likely to take is obtained (200). This information is applied to historical information about previously-processed calls to estimate (202) how long completion of the processing of each of those calls is likely to take, i.e., how long it will be before the agents (25) who are processing those calls become available to handle the waiting calls. The estimated times are then used (210) as the predicted wait times of that plurality of the waiting calls. The technique is applicable to workflow management in general.

15 Claims, 2 Drawing Sheets

ESTIMATION OF A WORK ITEM'S WAIT-TIME FROM THE PRESENT STAGES OF PROCESSING OF PRECEDING WORK ITEMS

TECHNICAL FIELD

This invention relates to workflow management in general, and to queuing arrangements such as call centers and other communications-processing arrangements in particular.

BACKGROUND OF THE INVENTION

In call centers, telephone calls and other communications (generically referred to herein as calls) are answered and handled by any of a plurality of human agents or other resources such as interactive voice response systems (generically referred to herein as agents). An automatic call distribution (ACD) system distributes and connects calls to whatever agents are both suited to handle the calls and presently available to handle the calls. When no agents are available to handle calls as they come in, the calls are placed in one or more queues to await agents becoming available to handle them.

A critical function for smooth operation of, and effective routing of calls in, a call center is estimating how long a call will have to wait in a queue before being handled by an agent. This is true by analogy of other workflows as well. Numerous techniques have been developed over time to estimate a call's wait-time in queue. An illustrative example of such a technique is disclosed in U.S. Pat. No. 5,506,898. Various such techniques use a variety of data points to arrive at wait-time estimates, such as when a call enters or exits a queue, how fast a call progresses through a queue, when an agent logs in or out or goes on break or returns from break, etc.

With all such techniques, the maximum accuracy of their estimates is a function of the number of meaningful data points that are available to them as inputs. In high call-volume call centers e.g., ones servicing on the order of a call every second, many data points are available, and hence the techniques can produce quite accurate estimates. In low call-volume call centers, e.g., ones servicing on the order of a call every minute, the number of available data points is relatively limited, and consequently so is the techniques ability to produce accurate estimates. This is also true of call centers that distribute calls among many low-volume splits/skills. Combined with the fact that call-handling times are variable at best and unpredictable at worst (which typically makes the length of time that a call has already been handled a poor predictor of how much longer it will take to complete handling the call), predictions made by these techniques often are unreliable and achieving accuracy of estimates to within a few seconds may not be possible.

SUMMARY OF THE INVENTION

This invention is directed to solving these and other problems and disadvantages of the prior art. Generally according to the invention, additional data points are created—either manually or automatically—during the processing of each work item (e.g., call), for use in effecting wait-time estimates to improve the accuracy of wait-time predictions.

The procedure for improved prediction of wait times of calls (generically encompassing any communications) or other work items waiting to be processed (e.g., handled by an agent or another resource or handled by an agent or a resource different from the one that is presently handling the work item) involves obtaining information about a plurality of items that are presently being processed, using the obtained information to estimate times to completion of processing (e.g., either full completion, or completion of a particular processing task or step) of those items and then using those estimated times to predict the wait times of that plurality of the items that are waiting to be processed. Illustratively, the processing of the items that are being processed is effected by a plurality of agents (generically encompassing any desired call-processing resources), and estimation of times to processing completion involves estimating when those agents will become available to process other—the waiting—items. Alternatively, part of the processing of the items is effected by interactive systems, such as interactive voice response systems, and estimation of times to processing completion involves estimating when those items will request or become ready for processing by live agents. Preferably, the obtaining of information about items that are presently being processed involves obtaining information about an item at each point of a plurality of points in the processing of the item, which information is relevant to how long completion of the processing of the item is likely to take. In the case of calls, this may be, for example, information identifying the call type of each of the calls that are presently being processed, or information identifying the present stage of processing of each of those calls. The use of the estimated times-to-processing-completion as predictors of wait times of waiting items illustratively involves applying the obtained information about the items that are presently being processed to historical information about previously-processed items to estimate when the resources will become available to process the other items, and then using the estimated times as predicted wait times, either directly or after adjusting the estimated times by using the historical information about waiting times of the previously-processed items.

A method according to the invention comprises the steps of the just-characterized procedure, while an apparatus according to the invention effects the method steps. The apparatus preferably includes an effector—any entity that effects the corresponding step, unlike a means—for each step. The invention further encompasses a computer-readable medium containing instruction which, when executed in a computer, cause the computer to perform the method steps.

These and other features and advantages of the present invention will become evident from the following description of an illustrative embodiment of the invention considered together with the drawing.

DETAILED DESCRIPTION

Figure 1:
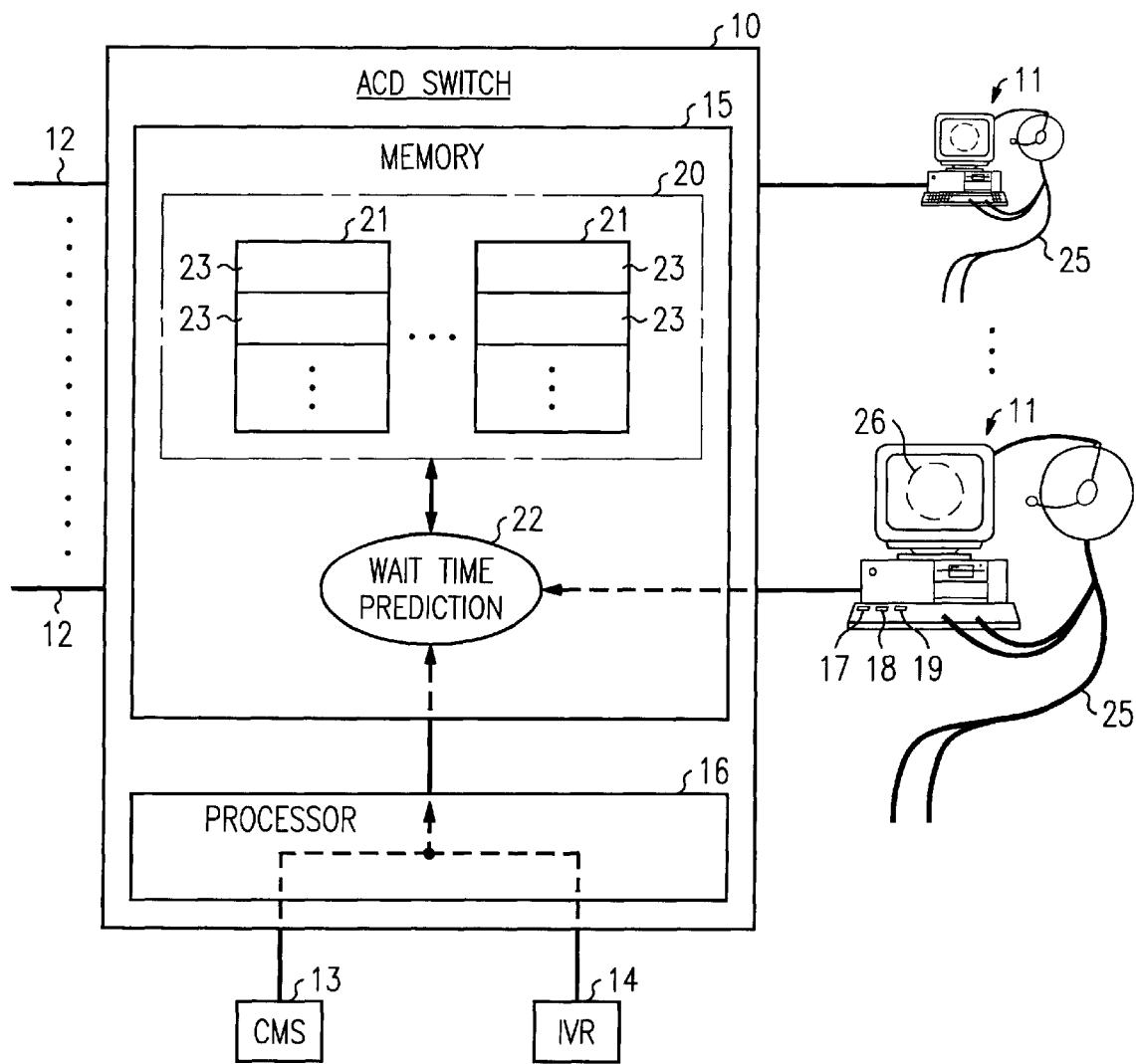
FIG. 1 is a block diagram of a call center that includes an illustrative embodiment of the invention.

FIG. 1 shows an illustrative call center that comprises an automatic call-distribution (ACD) switch 10 serving a plurality of agent stations 11 staffed by agents 25. ACD switch 10 is connected to a plurality of trunks 12 or other communications media over which it receives incoming calls. It then distributes and connects these calls to stations 11 of available agents 25 based on a set of predetermined criteria. The call center of FIG. 1 is illustratively the subscriber-premises equipment disclosed in Kohler et al. U.S. Pat. No. 5,206,903, which is hereby incorporated herein by reference.

ACD switch 10 is also served by a pair of adjunct processors 13 and 14. Call management system (CMS) 13 provides a call accounting, reporting, and management capability, and an interactive voice response (IVR) system 14 provides an announcements and automated call-handling capability. Both adjunct processors 13 and 14 are conventional. CMS 13 is illustratively the Lucent CMS, and IVR 14 is illustratively the Lucent Conversant® IVR system. As is conventional, ACD system 10 is a stored-program-controlled apparatus that includes a memory 15 for storing programs and data, and a processor 16 for executing the stored programs and using the stored data in their execution. Memory 15 includes a set 20 of call queues 21. Each call queue 21 conventionally represents, i.e., serves and holds calls for, a different split or skill group of agents. Each queue 21 functions as a first-in, first-out (FIFO) buffer memory, and includes a plurality of entries, or positions 23, each representing, i.e., identifying, a corresponding one enqueued call. The position 23 at the head of queue 21 is considered to be position number 1, the next subsequent position 23 in queue 21 is considered to be position number 2, etc. Memory 15 further includes a wait-time prediction function 22 for predicting, or estimating, how long a call will have to wait in a queue 21 before being processed by an agent 25 or other resource such as IVR 14. Function 22 may include the conventional estimated wait-time (EWT) function that is disclosed in U.S. Pat. No. 5,506,898.

According to one illustrative embodiment of the invention, each agent station 11 is equipped with one or more actuators (e.g., indicator keys), each programmed to generate, when actuated, an event from which wait-time prediction function 22 can reference how much longer processing of a call that is presently being processed at this station 22 is expected to last. Illustratively, actuating one of the actuators at an agent station 11 results in a lookup of the actuator's corresponding time value a table entry associated with the call queue that was the source of the call which is presently being processed at that station 11. The table values are preferably constantly updated to reflect present operating conditions. For example, as shown in FIG. 1, each agent station 11 is equipped with three indicator keys 17–19 labeled "New", "Existing", and "Wrap-up", respectively. When an agent 25 receives a call for processing and identifies the other party to the call as a new customer, agent 25 presses "New" key 17. When an agent 25 receives a call for processing and identifies the other party to the call as an existing customer, agent 25 presses "Existing" key 18. And when an agent 25 completes interacting with a call and goes into an after-call wrap-up state, agent 25 presses "Wrap-up" key 19. IVR 14 may supply comparable information to function 22 regarding calls that it is processing. This information about the calls is relevant to how long completion of the processing of the call is likely to take, and hence it is relevant to how long it will be before the agents/resources become available to process other (waiting) calls.

Assume that call-processing times range from 1 to 9 minutes, and an average call takes 3 minutes on average to handle. This is very coarse data that is not particularly useful to wait-time prediction function 22. However, from historical call data stored by CMS 13, wait-time prediction function 22 knows that call-processing times are typically only 1 to 3 minutes, with an average of 2 minutes, for calls with existing customers, and 3 to 9 minutes, with an average of 6 minutes, for calls with new customers, and that average call wrap-up lasts about 30 seconds. Illustratively, these average values are stored in an entry of the above-mentioned table. So, if an agent 25 presses "Existing" key 17, function 22 can anticipate that the agent will become available in about 2.5 minutes, if an agent 25 presses "New" key 18, function 22 can anticipate that the agent will become available in about 6.5 minutes, and if an agent 25 presses "Wrap-up" key 19, function 22 can anticipate that the agent will become available in about 30 seconds. Keys 17–19 thus provide function 22 with additional data points for use in predicting in-queue 21 wait times, thereby making the predictions more accurate.

According to a second, preferred, illustrative embodiment of the invention, each agent's station 11 and other call-processing resources such as IVR 14 automatically report to function 22 data indicative of the present stage of processing of a call that the resource is presently processing, and hence indicative of how much longer processing of that call is expected to last. For example, as shown in FIG. 1, each agent's station 11 executes a computer telephony integration (CTI) script 26 which an agent 25 follows in handling a call. The IVR 14 likewise executes and follows a similar script. The script repeatedly reports to function 22 the agent's or IVR's present place in the execution of the script. Again, from historical call data stored by CMS 13, wait-time prediction function 22 knows how long it takes on average from anyplace in the execution of the script to complete processing of a call and the agent or other resource becoming free. Scripts 26 thus provide function 22 with additional data points for use in predicting in-queue 21 wait times, thereby making the predictions more accurate.

The following description outlines how wait-time prediction function 22 uses the data provided by agent stations 11 and other resources such as IVR 14. For each reported completed step in a CTI script 26, function 22 maintains an estimate of the expected remaining time before processing of the call is completed, designated as E:step. This estimate is based on historical data obtained from previously-processed calls. Every call is time-stamped at every reported step in the CTI script 26, with a time stamp designated as T:step. When processing of each call is completed, at a time designated as T:complete, the following procedure is performed for each step in the CTI script 26. Firstly, actual time that it took to complete processing of the call from the subject step, is computed as $$A\text{:step} = T\text{:complete} - T\text{:step}.$$

Secondly, an adjustment to the estimated time-to-processing-completion from this step is computed as $$E\text{:step} = (x\% \text{ of } A\text{:step}) + (100-x)\% \text{ of } E\text{:step}$$

The adjustment factor x is used to bring the adjusted value of E:step closer in line with the actual time-to-handing-completion A:step. The value of x is determined by simulation or from historical data on the divergence of E:step and A:step. The value of x is anticipated to fall between 3 and 10. When agents log in, log out, go on break, or return from break, appropriate adjustments to E:step are also made to account for the new staffing level. The adjustment to E:step is computed as $$E\text{:step} = E\text{:step} \cdot (\# \text{ of agents\_old} / \# \text{ agents\_new}).$$

The adjusted value of E:step is then saved and used as the estimated time-to-processing-completion of the next call that arrives at the corresponding step in CTI script 26.

Figure 2:
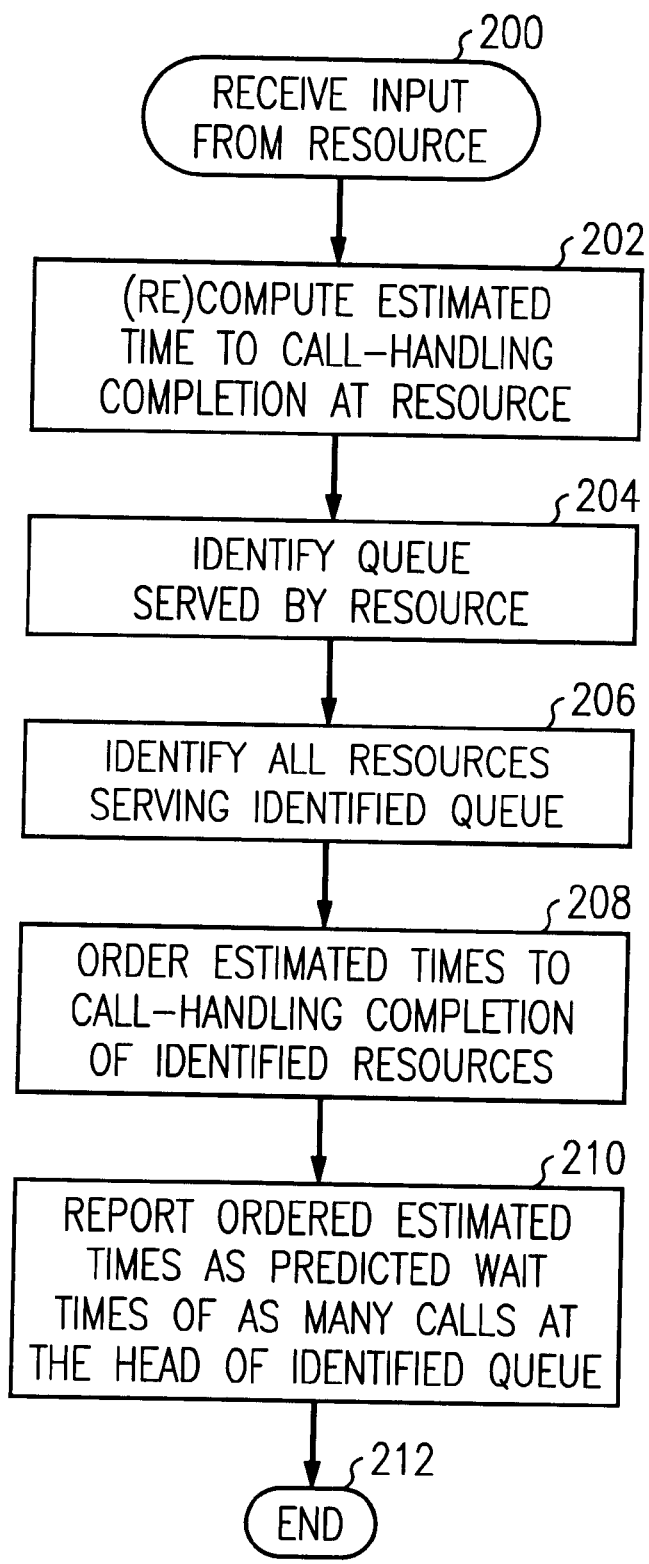
FIG. 2 is a functional flow diagram of operations of a wait-time predication function of the call center of FIG. 1.

The operation of wait-time prediction function 22 is illustrated in FIG. 2. It is triggered by receipt, from an agent station 11 or other resource such as IVR 14, of information, described above, indicative of how much longer handling of a call that is presently being processed by this resource is expected to last, at step 200. In response, function 22 uses the received information to compute or recompute the estimated time to call-processing-completion at, and hence the time to availability of, the reporting resource, at step 202. Function 22 identifies the queue 21 that is served by the reporting resource, at, step 204. If the resource serves a plurality of queues 21, a determination is made of which queue 21 is most likely to be served next by the resource, e.g., on the basis of the priority of skills possessed by the resource.

Once the served queue 21 is identified, function 22 identifies all agents 25 and other resources that serve that queue 21, at step 206. Function 22 then orders the estimated times-to-call-processing-completion of all of these identified resources in increasing order, at step 208, and reports these ordered times as the predicted in-queue wait times of as many calls at the head of the served queue 21, at step 210. For example, if there are 15 resources dedicated to serving this queue 21, then their ordered estimated times-to-call-processing-completion are the respective predicted in-queue wait times of the first 15 calls in that queue 21. For other calls in that queue 21, function 22 may use the conventional EWT function to predict their in-queue wait times. Operation of function 22 then ends, at step 212, until receipt of another item of information from a resource at step 200.

Of course, various changes and modifications to the illustrative embodiments described above will be apparent to those skilled in the art. For example, the invention is equally applicable to the handling of communications of any media (e.g., audiovisual, e-mail, fax, Internet, etc.) at any locations (e.g., off-net ACD, at-home agents, etc.) and by any agents (e.g., single-skilled or multi-skilled). The invention is likewise applicable to any workflow management system (e.g., assembly-line manufacturing, automated circuit-pack assembly, etc.). Moreover, the invention is also suitable for predicting the processing-completion times of items that are presently being processed, based on information obtained about previously-processed items, as well as forecasting, e.g., how many self-service calls might be coming to "live" agents or how many agents are processing calls in a way that might lead to imminent transfer of the calls to another processing entity. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of predicting wait times of items that are waiting to be processed, comprising:

computing from historical data about processed items of a plurality of item types, an average time for completing processing from each one of a plurality of stages in said processing of an item of each one of the plurality of the item types;

determining the item type of each one of a plurality of items that are presently being processed;

at each point of a plurality of points in the processing of said each one of the items that are presently being processed, determining a present stage of the processing of the item;

using the stage and type determinations to estimate from the computed averages a time to completion of the processing of said each one of the items that are presently being processed;

using the estimated times as respective predicted wait times for processing of respective ones of the plurality of the items that are waiting to be processed next; and in response to completion of the processing of an item of one of the item types that is presently being processed, recomputing the average times for completing the processing of the items of the one type.

2. The method of claim 1 wherein:

determining a present stage of processing comprises
      determining the present stages of the processing of the items, which are presently being processed by a plurality of resources; and
   using comprises
      from the stage and type determinations, estimating times when resources of the plurality of resources will become available to process other items.

3. The method of claim 2 wherein:

determining a present stage of processing comprises
      for each resource of the plurality of resources, determining whether the resource has activated an indicator of a stage of processing.

4. The method of claim 2 wherein:

determining a present stage of processing comprises
      determining where each one of the plurality of resources is in executing a processing script.

5. The method of claim 2 wherein:

determining the item type comprises
      determining that a resource that is processing an item has activated an indicator of the item type of the item.

6. The method of claim 2 wherein:

determining the item type comprises
      determining that an agent who is handling a communication item has entered an indication of the item type of the communication item.

7. A apparatus for predicting wait times of items that are waiting to be processed, comprising:

a computer of an average time for completing processing from each one of a plurality of stages in processing of a processed item of each one of a plurality of item types from historical data about processed items of a plurality of item types;

a determinator of the item type of each one of a plurality of items that are presently being processed;

a determinator of a present stage of processing of an item at each point of a plurality of points in the processing of said each one of the items that are presently being processed;

an estimator of a time to completion of the processing of said each one of the items that are presently being processed, using the stage and type determinations to estimate from the computed averages said time to completion; and a user of the estimated times as respective predicted wait times for processing of respective ones of the plurality of the times that are waiting to be processed next;

the computer being responsive to completion of the processing of an item of one of the item types that is presently being processed, by recomputing the average times for completing the processing of the items of the one type.

8. The apparatus of claim 7 wherein:

the determinator of the present stage of processing determines the present stages of processing of the items, which are presently being processed by a plurality of resources; and the estimator estimates, from the stage and type determinations, times when resources of the plurality of resources will become available to process other items.

9. The apparatus of claim 7 wherein:

the determinator of the item type comprises
a determinator of which one of a plurality of item-type indicators was activated by each resource of the plurality of resources.

10. The apparatus of claim 7 wherein:

the determinator of a present stage of processing determines, for each resource of the plurality of resources, whether the resource has activated an indicator of a stage of processing.

11. The apparatus of claim 7 wherein:

the determinator of a present stage of processing determines where each one of the plurality of resources is in executing a processing script.

12. The apparatus of claim 8 wherein:

the determinator of the item type determines that a resource that is processing an item has activated an indicator of the item type of the item.

13. The apparatus of claim 8 wherein:

the determinator of the item type determines that an agent who is handling a communication item has entered an indication of the item type of the communication item.

14. An apparatus that performs the method of one of the claims 1, 2, 5, 6, 3 and 4.

15. A computer readable medium containing instructions which, when executed in a computer, causes the computer to perform the method of one of the claims 1, 2, 5, 6, 3, and 4.

* * * * *